(12) United States Patent
Boehrer et al.

(10) Patent No.: US 10,637,945 B2
(45) Date of Patent: Apr. 28, 2020

(54) RECURRENT NOTIFICATION FRAMEWORK

(71) Applicant: SAP SE, Walldorf (DE)

(72) Inventors: Christian Boehrer, Hoepfingen (DE); Christine Hoerner, Karlsdorf-Neuthard (DE); Rick Weigel, Rheinstetten (DE); Antonia Gross-Tarakji, Sinsheim (DE); Benjamin Klehr, Kuppenheim (DE); Harald Kopf, Heidelberg (DE); Marcel Kassner, Hockenheim (DE); Markus Reetz-Lamour, Walldorf (DE); Thomas Salvador, Oestringen (DE); Pramod Sidlaghatta Jaiprakash, Sandhausen (DE)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 15/847,927

(22) Filed: Dec. 20, 2017

(65) Prior Publication Data
US 2019/0191000 A1    Jun. 20, 2019

(51) Int. Cl.
| H04L 29/08 | (2006.01) |
| G06F 9/44 | (2018.01) |
| H04L 12/58 | (2006.01) |
| H04W 68/00 | (2009.01) |
| G06F 9/445 | (2018.01) |
| G06F 8/61 | (2018.01) |

(52) U.S. Cl.
CPC ............... *H04L 67/26* (2013.01); *G06F 9/44* (2013.01); *H04L 51/00* (2013.01); *H04W 68/00* (2013.01); *G06F 8/61* (2013.01); *G06F 9/44505* (2013.01); *H04L 67/10* (2013.01); *H04L 67/16* (2013.01)

(58) Field of Classification Search
CPC ......... H04L 67/26; H04L 67/10; H04L 67/16; H04L 51/00; G06F 8/61; G06F 9/44; G06F 9/44505; H04W 68/00
USPC .......................................................... 709/217
See application file for complete search history.

(56) References Cited

U.S. PATENT DOCUMENTS

| 9,774,410 | B2 * | 9/2017 | Daoura | ................. | H04W 40/22 |
| 2004/0225718 | A1 * | 11/2004 | Heinzel | ................. | G06Q 10/107 |
| | | | | | 709/206 |
| 2015/0058975 | A1 * | 2/2015 | Raskin | ................. | G06F 21/85 |
| | | | | | 726/22 |
| 2016/0182170 | A1 * | 6/2016 | Daoura | ................. | H04W 40/22 |
| | | | | | 455/3.01 |
| 2017/0373775 | A1 * | 12/2017 | Daoura | ................. | H04W 40/22 |

* cited by examiner

*Primary Examiner* — Kristie D Shingles
(74) *Attorney, Agent, or Firm* — Buckley, Maschoff & Talwalkar LLC

(57) ABSTRACT

A notification job is executed as a background job in a recurrent notification framework. The registered scenario along with the recurrent notification information is retrieved from a central notification scenario registration table. The user information along with an application context is retrieved from a notification scenario BADI. The user information along with a notification preference is retrieved from a user registration table. The mapping information of the user identifier and the device identifier is retrieved from the device registration table. Based on the retrieved information, the notification channel is identified from the recurrent notification information. A recurrent notification is sent through the notification channel to a device.

21 Claims, 7 Drawing Sheets

RECURRENT NOTIFICATION FRAMEWORK

BACKGROUND

Cloud based enterprise resource planning software products designed for small and medium-sized enterprises have established processes to regularly send reminders to employees, partners, vendors, etc., to ensure completion of critical tasks/transactions. Typically, such enterprises use custom built email or calendar reminders. Custom built email or calendar reminders are based on email or personal message management clients and servers. For example, the reminders may be for approvals, event recordings, etc. The reminders may be based on occurrence of certain events. In a scenario where reminders are to be sent on a periodic basis and through various channels other than emails, it is challenging to have a single framework that enables sending reminders on a periodic basis and through various channels.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of recurrent notifications framework are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
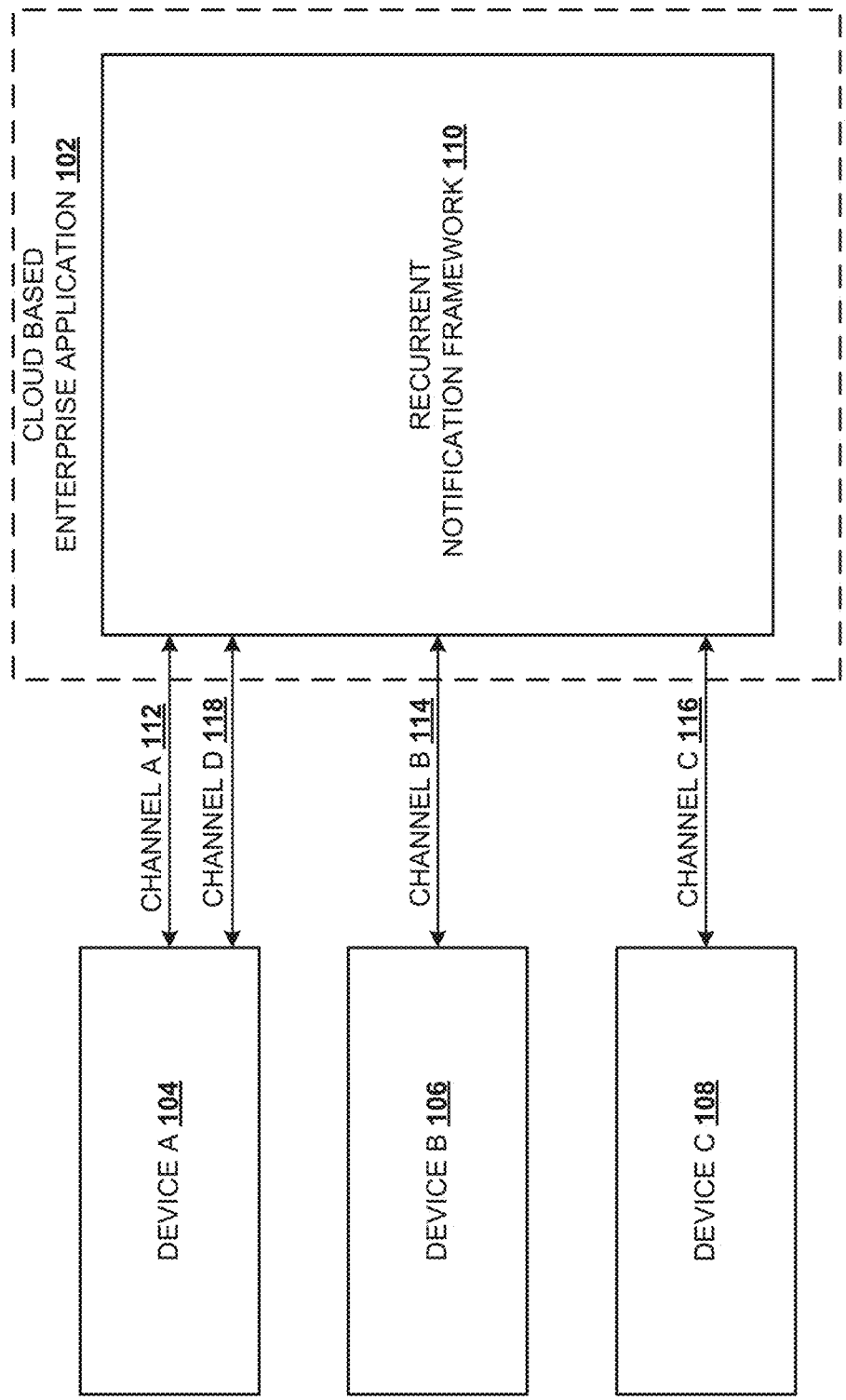
FIG. 1 is a block diagram illustrating architecture of a recurrent notification framework, according to one embodiment.

FIG. 1 is a block diagram illustrating architecture of a recurrent notification framework, according to one embodiment. A cloud based enterprise application 102 may be a software as a service (SAAS) application. The cloud based enterprise application 102 is designed to track end-to-end processes for various services such as customer relationship management, financial management, project management, supply chain management, compliance management, executive management support, etc. These processes involve notifying entities such as users, employees, customers, vendors, etc., on a periodic basis of their tasks or responsibilities. Device A 104 may be a mobile device, device B 106 may be a portable computer and device C 108 may be a sensor. These devices are connected to the cloud based enterprise application 102 using a combination of hypertext markup language secure (HTTPS) protocol, transmission control protocol/internet protocol (TCP/IP), and various other protocols that may be deemed appropriate.

Recurrent notification framework 110 in the cloud based enterprise application 102 enables various notification channels such as email channel, push notification channel, IoT (internet of things) channel, etc. For example, device A 104 may be connected to the recurrent notification framework 110 through channel A 112 such as push notification. The portable computer device B may be connected to the recurrent notification framework 110 through channel B 114 such as email notification. The device C may be connected to the recurrent notification framework 110 through channel C 116 such as IoT notification. The recurrent notification framework 110 is agnostic of the devices connected to them, and the recurrent notification framework 110 is capable of sending recurrent notifications to the devices connected through the corresponding channel. Single device may be connected to the recurrent notification framework 110 through one or more channels. For example, the mobile device e.g., device A 104 may be connected to the recurrent notification framework 110 through channel A 112 and channel D 118.

For example, a recurrent notification to send weekly reminder on every Wednesday 10 am may be sent from the recurrent notification framework 110 to the mobile device such as device A 104. The notification on the mobile device such as device A 104 may be displayed as a banner, where the notification is shown on the top portion of the device A 104. Displaying as a banner is merely exemplary, the recurrent notification may be displayed as an alert or a badge depending on the preferences configured in the device A 104. For example, a recurring notification to send bi-weekly reminder on every Monday 9 a.m. may be sent from the recurrent notification framework 110 to the portable computer such as device B 106. The notification to the portable computer such as device B 106 may be in the form of an email. If the device A 104 is configured to support the notification channels such as push notification and email notification, the device A 104 may receive recurrent notification simultaneously from both the channels.

Figure 2A:
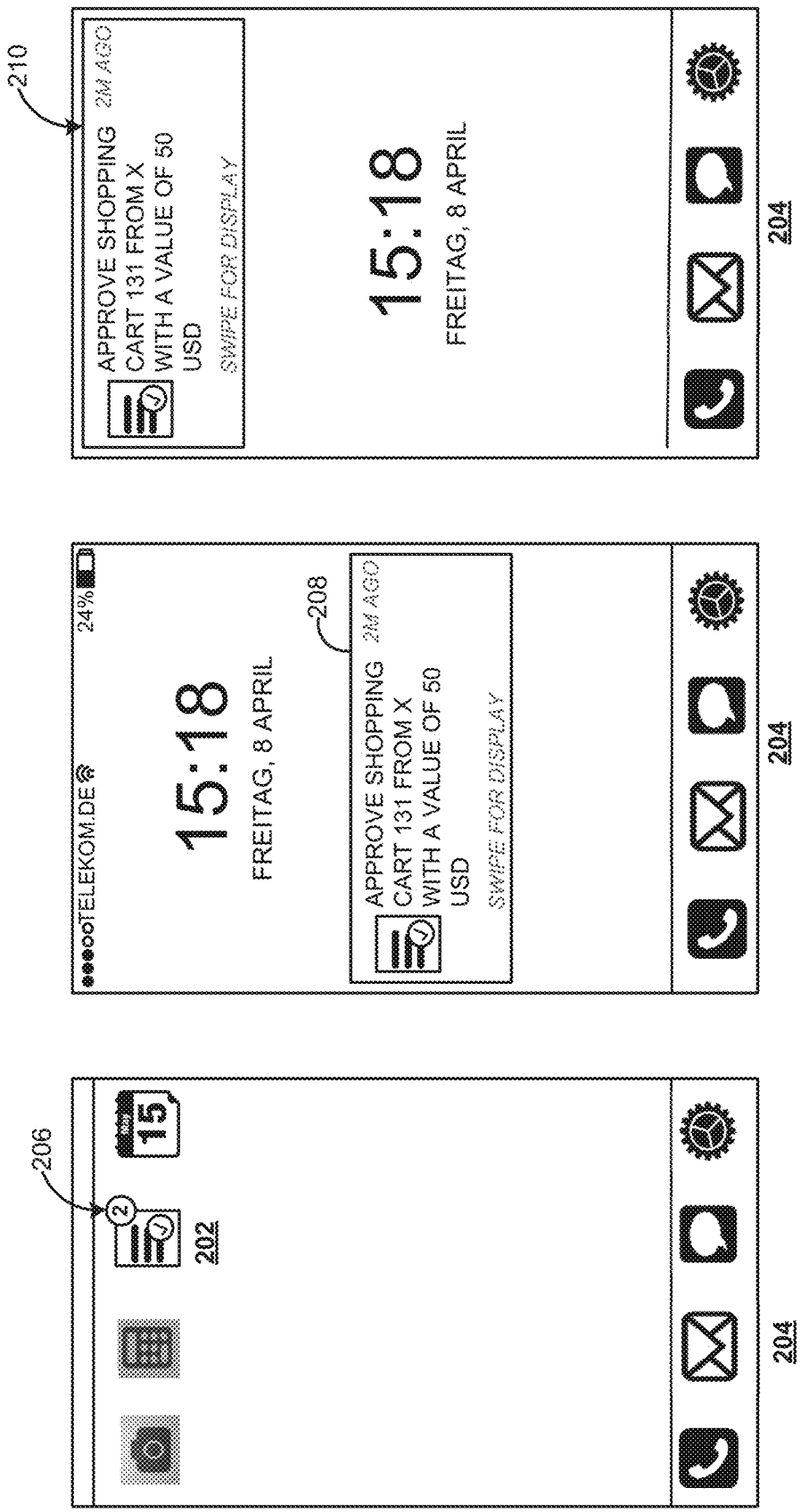
FIG. 2A shows exemplary user interfaces showing mobile notifications displayed in a mobile device from a recurrent notification framework, according to one embodiment.

FIG. 2A shows exemplary user interfaces showing mobile notifications displayed in a mobile device from a recurrent notification framework, according to one embodiment. An app 202 such as time recording app installed on the mobile device 204 may be registered with a recurrent notification framework. A user accessing the app 202 may be registered with the recurrent notification framework to receive recurrent notifications. The notification on the mobile device 204 may be displayed as badge 206. For example, a recurrent notification such as weekly reminder every Tuesday 8 a.m., may be sent from the recurrent notification framework to the app in the mobile device. At 8 am on Tuesday, the recurrent notification is sent from the notification framework to the app in the mobile device as the badge 206 notification. A small red visual representation '2' displayed in the top right corner of the app is referred to as the badge 206. This indicates the user that the recurrent notification is awaiting user action. When the badge is clicked, the recurrent notification is displayed to the user in the mobile device for further action by the user. The recurrent notification is sent from the notification framework to the app in the mobile device at 8 a.m., on the subsequent Tuesday. The recurrent notification may also be displayed in the form of badge 206 or banner 208. For example, the recurrent notification 'approve shopping cart 131 from X with a value of 50 USD' is displayed as badge as shown in 208, and displayed as a banner as shown in 210.

Figure 2B:
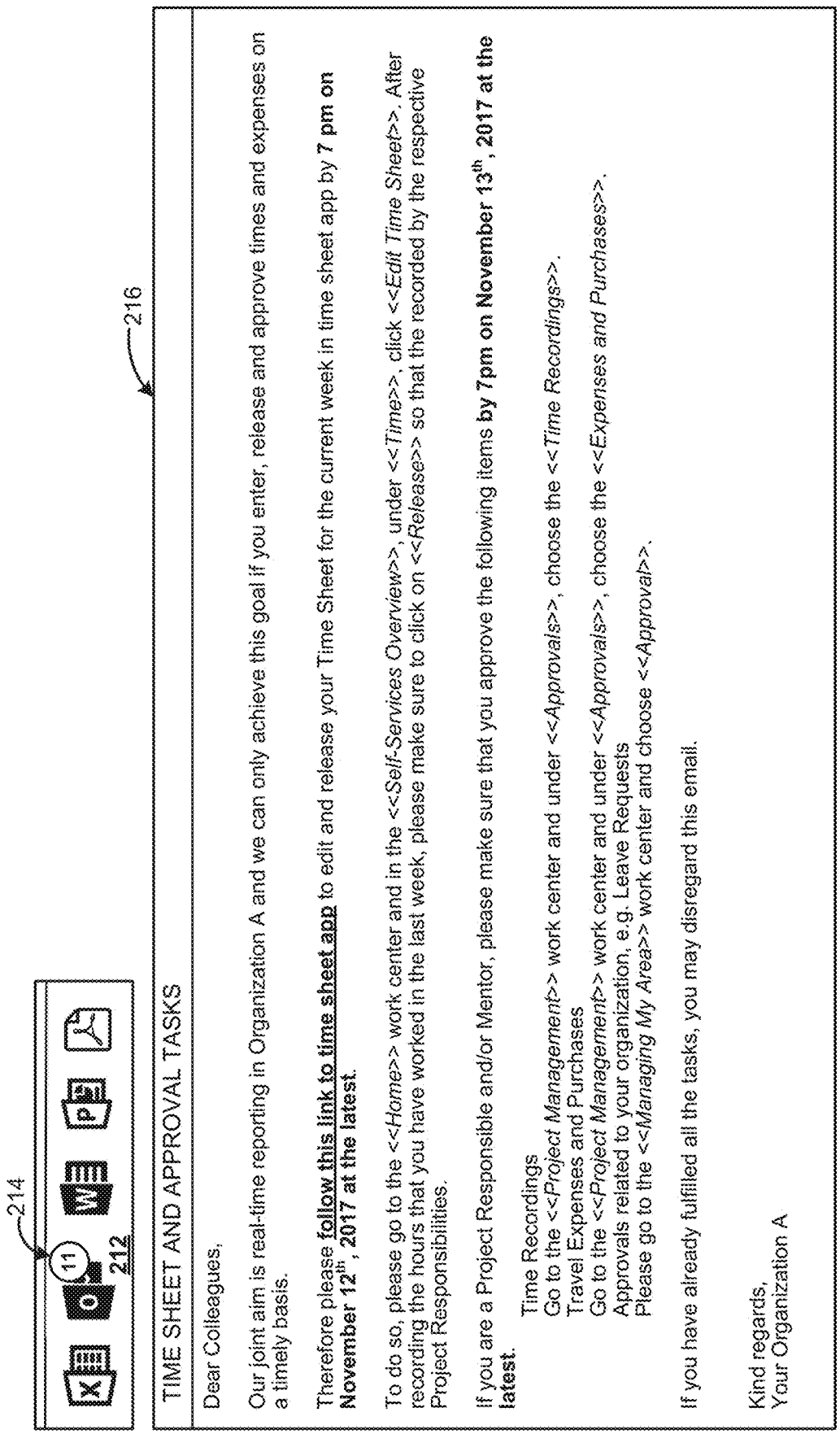
FIG. 2B shows an email notification displayed in a portable device from a recurrent notification framework, according to one embodiment.

FIG. 2B shows an email notification displayed in a portable device from a recurrent notification framework, according to one embodiment. An app such as project management app may be registered with the recurrent notification framework, and a user accessing the app may register with the recurrent notification framework to receive recurrent notifications. The recurrent notification on the portable device may be displayed as the email notification. For example, a recurrent notification to send bi-weekly reminder on Monday 10 p.m., may be sent from the notification framework to the app in the portable device. At 10 p.m., on Monday, an email notification is sent from the recurrent notification framework to an email client configured in the portable device. For example, email client 212 configured in the portable device receives the email notification as indicated by visual representation 214. When the received email notification is clicked and opened, the email is displayed as shown in 216. The email notification includes content corresponding to the approval task and a link that establishes connection to the app. When the user clicks on the link, corresponding approval task is opened in the app for the user to approve.

Figure 3:
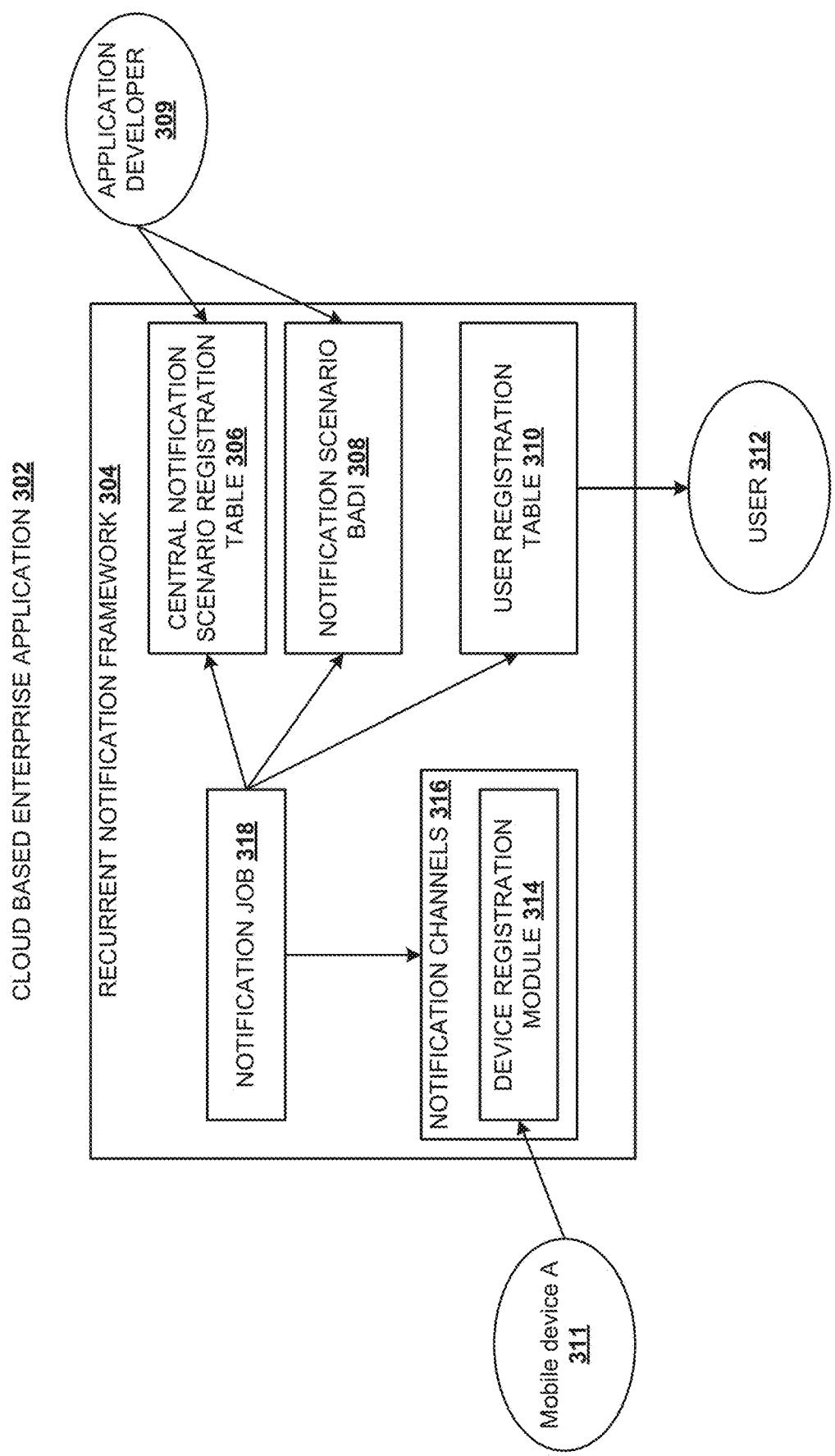
FIG. 3 is a block diagram illustrating a high-level architecture of a notification framework, according to one embodiment.

FIG. 3 is a block diagram illustrating a high-level architecture of a recurrent notification framework, according to one embodiment. In cloud based enterprise application 302 various modules, components and tables with various functionalities enabling recurrent notification framework 304 is explained below. Various notification scenarios with recurrent notification information such as date and time, next recurrence information, supported channels, etc., are registered in central notification scenario registration table 306. For example, a notification scenario e.g., time recording with recurrence information e.g., weekly, every Thursday at 10 a.m., next recurrence information e.g., next Thursday at 10 a.m., and supported channel e.g., push notification is stored in the central notification scenario registration table 306. Notification scenario business add-in (BADI) 308 is a source code plug-in used to add business functionality/other functionality to existing code. General notification functionality in the cloud based enterprise application 302 can be extended with additional functionalities such as providing custom text notification messages. For example, 'GET_NOTIFICATION' method returns user related information along with application context including app information. For example, user related information such as 'user id A' along with 'app X' is returned. BADI implementation such as 'TIM_MOB_NOTIFICATION' method adds the functionality of custom text message to the general notification functionality. 'TIM_MOB_NOTIFICATION' function returns custom text message e.g., "your time recording is not complete, please complete your time recording". Registering the notification scenario in the central notification scenario registration table 306 and extending functionality in the notification scenario BADI 308 may be performed by application developer 309.

User registration table 310 includes the details of the users registered with the recurrent notification framework 304. User 312 may choose to register notifications for a specific app, and further, the user may also provide additional information such as notification preference of day and time, and this information is stored in the user registration table 310. When 'user A' opens the 'app X' for the first time in mobile device A 311, the 'user A' may choose to set a preference to receive or not receive notifications, and a notification channel for the notifications. For example, 'user A' along with 'app X' and selection of push notification may be stored in the user registration table 310. When the user opens the 'app X' for the first time, and sets the preference to receive mobile push notifications, an authorization will be sent to the push notification service provider's server of the mobile device A 311. Devices used by the user such as the mobile device may be registered in device registration module 314 with a device identifier. The device may be registered with one or more notification channels. For example, device identifier 'mobile device A' 311 used by the user identifier 'user A' is registered in the device registration module 314.

Notification channels 316 include various notification channels such as push notification, email notification, and IoT notification. For example, the notification channel is identified as push notification based on the recurrent information retrieved from the central notification scenario registration table 306. Notification job 318 is a central job that runs as a background job and handles the registered notification scenarios. The notification job 318 periodically polls the central notification scenario registration table 306 to identify and retrieve the registered notification scenarios. Based on the registered notification scenario, the notification job 318 polls notification scenario BADI 308 to retrieve custom notification message, user registration table 310 to retrieve details of the registered users, and identify a corresponding notification channel to send notifications.

The push notification is responsible for pushing the notification to the mobile device A 311. If the 'app X' would like to send a notification to the user's 'mobile device A' 311, the 'app X' calls an application programming interface (API) from the push notification to determine the registered 'user A' from the user registration table to send notification. Similarly, the email notification is configured to send email from an email server to the 'mobile device A' 311, and the IoT notification may be configured to send notification from IoT server to the 'mobile device A' 311 or 'portable computer A'. The notification job 318 can be configured to run on a periodic/recurrent basis e.g., daily every hour. The notification job 318 runs every hour and polls the central notification scenario registration table 306.

In the above example, the notification job 318 polls the central notification scenario registration table 306 and determines that a time recording notification scenario is registered with weekly recurrence on every Thursday at 10 a.m. The notification job 318 determines user related information such as 'user A', and application context such as 'app X' and custom text message "your time recording is not complete, please complete your time recording" from the notification scenario BADI 308. The notification job 318 retrieves 'user A' along with app information 'app X', and selection of push notification from the user registration table 310. The notification job 318 also determines that the 'mobile device A' 311 is registered for 'user A'. The notification job 318 executes the time recording notification on Thursday at 10 a.m., and sends the custom text message "your time recording is not complete, please complete your time recording" notification using the push notification to the 'mobile device A' 311.

In one embodiment, if the execution of notification job 318 fails due to failure in hardware or software, the notification job 318 is executed when the failure in hardware or software is rectified. For example, if the execution of notification job 318 on Thursday at 10 a.m., fails, the notification job 318 is executed on Thursday 11 p.m., when the execution of the notification job 318 resumes. In one embodiment, if the 'user A' chooses not to receive any notification, when the notification job 318 executes the time recording notification, no notification is sent to the 'user A'. User preference overrides the recurrent information provided in the central notification scenario registration table 306. For example, if the recurrent information e.g., weekly, every Monday at 10 a.m., is provided in the central notification scenario registration table 306, and if the user provides the notification preference as weekly, every Thursday at 8 a.m., the user preference overrides the recurrent information provided in the central notification scenario registration table 306. In case no user preference is provided, notifications are sent based on the recurrent information provided in the central notification scenario registration table 306.

Figure 4:
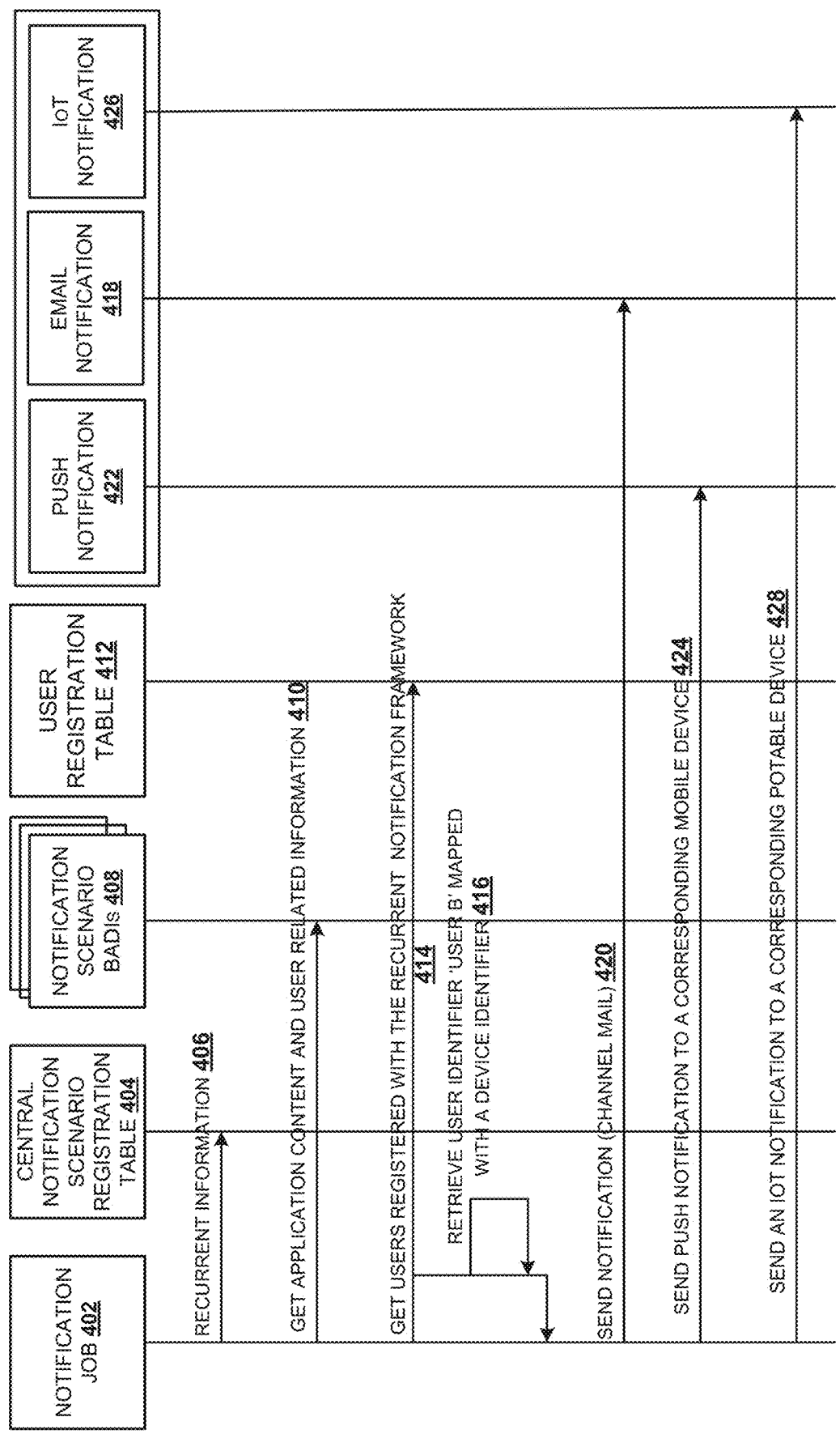
FIG. 4 is a sequence diagram illustrating a recurrent notification framework, according to one embodiment.

FIG. 4 is a sequence diagram illustrating a recurrent notification framework, according to one embodiment. Notification job 402 executes as a background job in the recurrent notification framework. The notification job 402 runs periodically such as every hour, and polls the central notification scenario registration table 404. When the notification job 402 polls the central notification scenario registration table 404, the notification job 402 gets the registered scenarios along with recurrent information 406. For example, a notification scenario e.g., time recording with recurrent information e.g., weekly, every Wednesday at 9 a.m., next recurrence information e.g., next Wednesday at 9 a.m., and supported channel e.g., email notification is stored in the central notification scenario registration table 404. When the notification job 402 polls the central notification scenario registration table 404, the time recording notification scenario with recurrent information is retrieved from the central notification scenario registration table 404. Based on the retrieved notification scenario, the notification job 402, polls notification scenario BADI 408 to get user related information and application context 410. For example, user related information such as 'user B' along with application context 'app Z' is returned. Further, the custom text message registered for 'app Z' is also retrieved. Accordingly, user related information 'user B', application context 'app Z', and custom text message registered for 'app Z' is returned to the notification job 402.

The notification job 402 polls the user registration table 412 to get details 414 of users registered with the recurrent notification framework. A user may choose to register notification for a specific app in the user registration table 412 along with notification preference of day and time. For example, 'user B' along with 'app Z' and selection of email notification may be stored in the user registration table 412. The notification job 402 collates the information retrieved from the central notification scenario registration table 404, the notification scenario BADI 408 and the user registration table 412. The retrieved user identifier 'user B' is mapped 416 with a device identifier e.g. mobile device A registered in a device registration table (not shown). After mapping the corresponding device with 'user B', the notification job 402 determines that a notification email with the custom text message can be sent using email notification channel 418. The notification job 402 enables the email notification channel 418 to send the notification email 420 on Wednesday at 9 a.m. If the notification job 402 determines that the notification channel is push notification 422, the notification job 402 enables sending a push notification 424 to a corresponding mobile device. Similarly, if the notification job 402 determines that the notification channel is IoT notification 426, the notification job 402 enables sending an IoT notification 428 to a corresponding potable device.

For example, a notification scenario for calendar such as meeting with manager can be registered with the central notification scenario registration table 404. When the notification job 402 polls the central notification scenario registration table 404, the time recording notification scenario with recurrent information is retrieved from the central notification scenario registration table 404. Based on the retrieved notification scenario, the notification job 402, polls notification scenario BADI 408 to get user related information and application context 410. The notification scenario BADI 408 may be defined to alert e.g., vibrate for the channel IoT in device e.g., pager. The notification job 402 determines that the notification channel is IoT notification 426, the notification job 402 enables sending an IoT notification 428 to the IoT pager in the form of vibrate alert. In one embodiment, while defining the notification scenario a level of urgency may be associated with an event. When the notification channel is identified as IoT notification channel, based on the level of urgency defined, notification is sent accordingly. In one embodiment, the device or the mobile device may be configured to support various notification formats such as badge, banner, vibrate, sound, etc., depending on the type of event, level of urgency of the event, etc., and these configurations are defined in notification scenario BADI and/or device registration module. Such notifications may be provided in the device if the device supports the specified notification formats.

Figure 5:
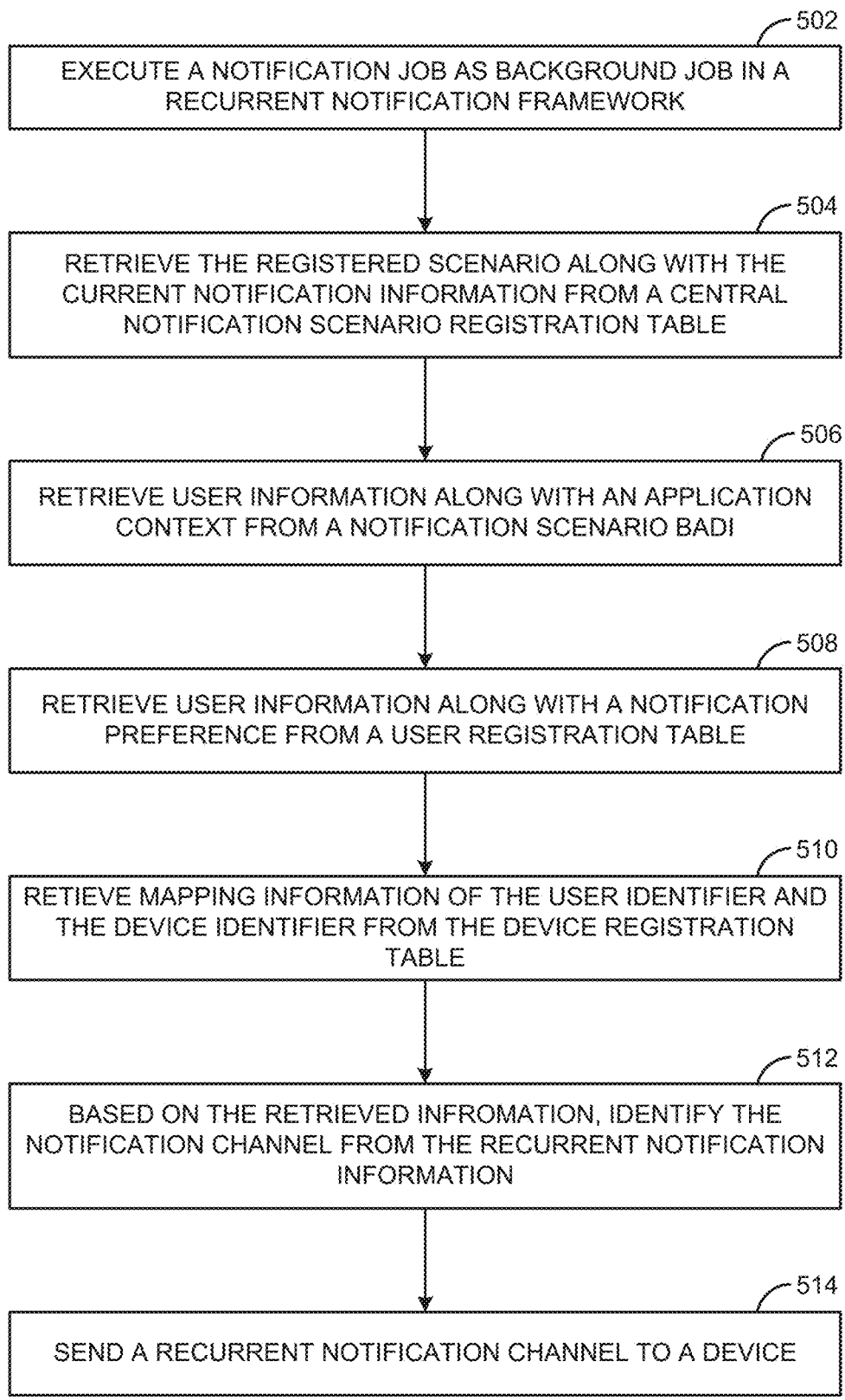
FIG. 5 is a flow chart illustrating a process of recurrent notifications, according to one embodiment.

FIG. 5 is flow chart illustrating a process of recurrent notification, according to one embodiment. At 502, a notification job is executed as a background job in a recurrent notification framework. For example, as shown in FIG. 3, the notification job 318 is a central job that runs as a background job and handles the registered notification scenarios. At 504, the registered scenario along with the recurrent notification information is retrieved from a central notification scenario registration table. For example, as shown in FIG. 3, the notification job 318 periodically polls the central notification scenario registration table 306 to identify and retrieve the registered notification scenarios. At 506, user information along with an application context is retrieved from a notification scenario BADI. At 508, user information along with a notification preference is retrieved from a user registration table. For example, as shown in FIG. 3, based on the registered notification scenario, the notification job 318 polls notification scenario BADI 308 to retrieve custom notification message, user registration table 310 to retrieve details of the registered users, and identify a corresponding notification channel to send notifications. At 510, mapping information of the user identifier and the device identifier is retrieved from the device registration table. For example, as explained in FIG. 3, the device identifier 'mobile device A' used by the user identifier 'user A' is. Based on the retrieved information, at 512, identify the notification channel from the recurrent notification information. At 514, a recurrent notification is sent through the notification channel to a device. For example, as explained in FIG. 3, the notification channel is identified as push notification based on the recurrent information retrieved from the central notification scenario registration table 306. For example, the push notification is responsible for pushing the notification to the mobile device A.

The recurrent notification framework is advantageous because it is a single notification framework enabling multiple notification channels. Development time and effort is minimized, and instead of deploying multiple modules for various channels, single deployment of the notification framework improves efficiency. In a typically large project management scenario, the notification framework helps in sending notification to multiple users simultaneously in multiple channels there by improving efficiency. For example, the tasks in the project management that are overdue can be notified through multiple channels to multiple users at once. For example, a hardware appliance such as server may be connected to a sensor to monitor the functioning of the server. The sensor may be associated with the notification framework to notify the administrators when a server failure event occurs. The server failure event notification may be recurrent for example, every 5 minutes until the server failure is attended by the administrator by responding to the email.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
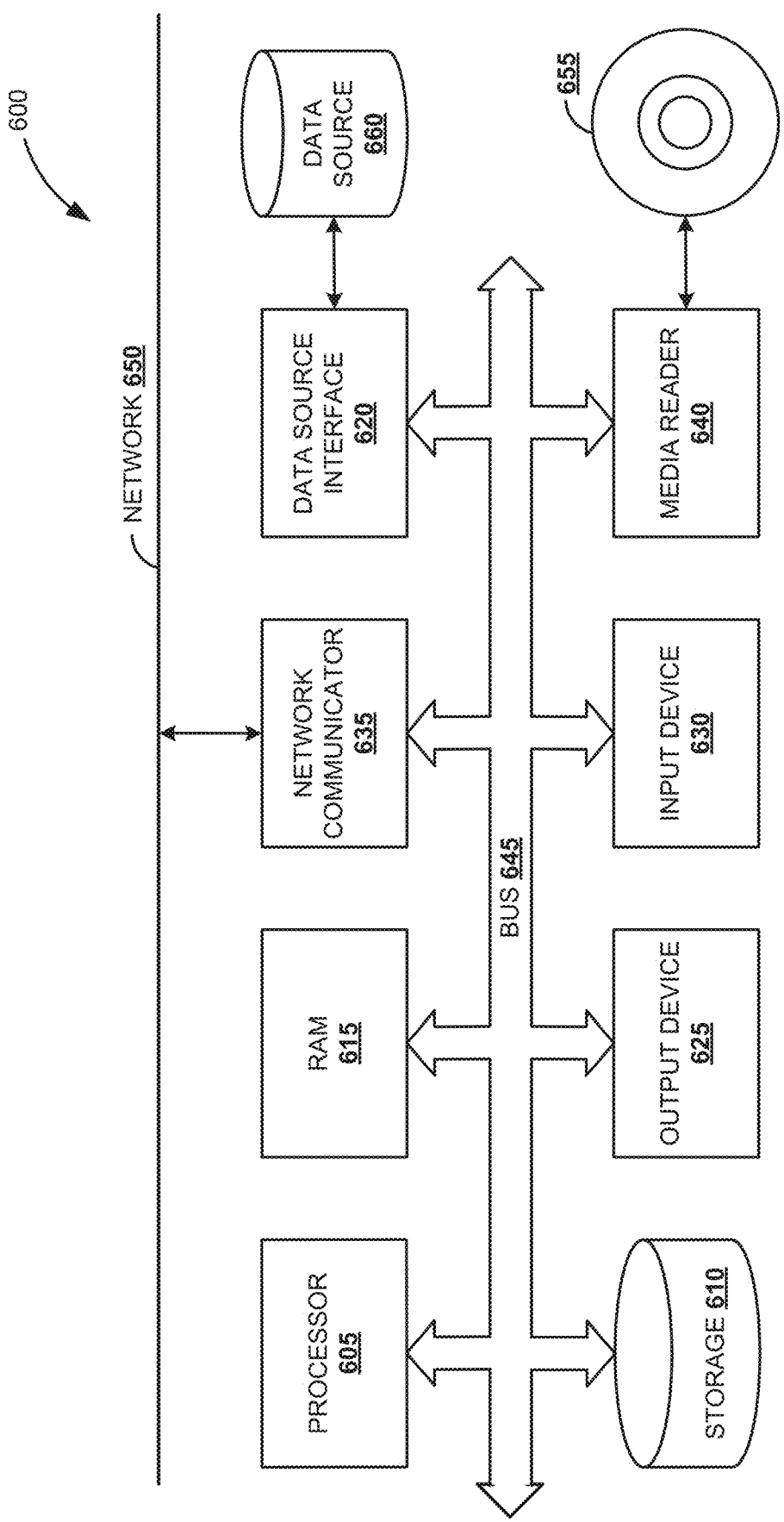
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments, the data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    execute a notification job as a background job in a recurrent notification framework, wherein the recurrent notification framework provides for sending a recurrent notification on a periodic basis;
    retrieve a registered scenario along with a recurrent notification information from the recurrent notification framework, wherein the registered scenario is a particular situation for which the notification job is executed, and the registered scenario is registered in a central registration table, wherein the recurrent notification information includes date and time, next recurrence information and a notification channel;
    identify the notification channel from the recurrent notification information; and
    send the recurrent notification through the notification channel to a device.

2. The computer-readable medium of claim 1, further comprises instructions which when executed by the computer further cause the computer to:
    register a device with a device registration table in the recurrent notification framework; and
    map a user identifier with a device identifier in the device registration table.

3. The computer-readable medium of claim 2, further comprises instructions which when executed by the computer further cause the computer to:
    retrieve the registered scenario along with the recurrent notification information from a central notification scenario registration table;
    retrieve user information along with an application context from a notification scenario BADI;
    retrieve user information along with a notification preference from a user registration table;
    retrieve mapping information of the user identifier and the device identifier from the device registration table; and
    based on the retrieved information, identify the notification channel from the recurrent notification information.

4. The computer-readable medium of claim 3, further comprises instructions which when executed by the computer further cause the computer to:
    execute the notification job on a periodic basis;
    based on the retrieved information, identify a custom text notification from the application context; and
    send the recurrent notification with the custom text notification to the device.

5. The computer-readable medium of claim 3, wherein the registered scenario includes a notification scenario with the recurrent information.

6. The computer-readable medium of claim 5, further comprises instructions which when executed by the computer further cause the computer to:
    invoke an API in a push notification channel from an application installed on the device;
    determine a user identifier from the user registration table; and
    send the recurrent notification through the push notification channel to the user of the device.

7. The computer-readable medium of claim 3, further comprises instructions which when executed by the computer further cause the computer to:
    install an application in a device;
    configure a notification preference in the application; and
    based on the notification preference, receive the recurrent notification through the notification channel.

8. The computer-readable medium of claim 1, wherein the notification channel is one of a push notification channel, an email notification channel and an Internet of Things (IoT) notification channel.

9. A computer-implemented method of recurrent notification framework, the method comprising:
    executing a notification job as a background job in a recurrent notification framework, wherein the recurrent notification framework provides for sending a recurrent notification on a periodic basis;
    retrieving a registered scenario along with a recurrent notification information from the recurrent notification framework, wherein the registered scenario is a particular situation for which the notification job is executed, and the registered scenario is registered in a central registration table, wherein the recurrent notification information includes date and time, next recurrence information and a notification channel;
    identifying the notification channel from the recurrent notification information; and
    sending the recurrent notification through the notification channel to a device.

10. The method of claim 9, further comprising:
    registering a device with a device registration table in the recurrent notification framework; and
    mapping a user identifier with a device identifier in the device registration table.

11. The method of claim 10, further comprising:
    retrieving the registered scenario along with the recurrent notification information from a central notification scenario registration table;
    retrieving user information along with an application context from a notification scenario BADI;

retrieving user information along with a notification preference from a user registration table;
retrieving mapping information of the user identifier and the device identifier from the device registration table; and
based on the retrieved information, identifying the notification channel from the recurrent notification information.

12. The method of claim 11, further comprising:
executing the notification job on a periodic basis;
based on the retrieved information, identifying a custom text notification from the application context; and
sending the recurrent notification with the custom text notification to the device.

13. The method of claim 11, wherein the registered scenario includes a notification scenario with the recurrent information.

14. The method of claim 13, further comprising:
invoking an API in a push notification channel from an application installed on the device;
determining a user identifier from the user registration table; and
sending the recurrent notification through the push notification channel to the user of the device.

15. The method of claim 11, further comprising:
installing an application in a device;
configuring a notification preference in the application; and
based on the notification preference, receiving the recurrent notification through the notification channel.

16. A computer system for recurrent notification framework, comprising:
a computer memory to store program code; and
a processor to execute the program code to:
execute a notification job as a background job in a recurrent notification framework, wherein the recurrent notification framework provides for sending a recurrent notification on a periodic basis;
retrieve a registered scenario along with a recurrent notification information from the recurrent notification framework, wherein the registered scenario is a particular situation for which the notification job is executed, and the registered scenario is registered in a central registration table, wherein the recurrent notification information includes date and time, next recurrence information and a notification channel;
identify the notification channel from the recurrent notification information; and
send the recurrent notification through the notification channel to a device.

17. The system of claim 16, wherein the processor further executes the program code to:
register a device with a device registration table in the recurrent notification framework; and
map a user identifier with a device identifier in the device registration table.

18. The system of claim 17, wherein the processor further executes the program code to:
retrieve the registered scenario along with the recurrent notification information from a central notification scenario registration table;
retrieve user information along with an application context from a notification scenario BADI;
retrieve user information along with a notification preference from a user registration table;
retrieve mapping information of the user identifier and the device identifier from the device registration table; and
based on the retrieved information, identify the notification channel from the recurrent notification information.

19. The system of claim 18, wherein the processor further executes the program code to:
execute the notification job on a periodic basis;
based on the retrieved information, identify a custom text notification from the application context; and
send the recurrent notification with the custom text notification to the device.

20. The system of claim 18, wherein the registered scenario includes a notification scenario with the recurrent information.

21. The system of claim 18, wherein the processor further executes the program code to:
install an application in a device;
configure a notification preference in the application; and
based on the notification preference, receive the recurrent notification through the notification channel.

* * * * *